Patented Dec. 6, 1949

2,490,164

UNITED STATES PATENT OFFICE 2,490,164

TREATMENT OF CELLULOSE ESTERS

George W. Seymour, Blanche B. White, and Leonard J. Rosen, Cumberland, Md., assignors to Celanese Corporation of America, a corporation of Delaware No Drawing. Application September 13, 1946, Serial No. 696,952

2 Claims. (Cl. 260—230)

This invention relates to the treatment of organic acid esters of cellulose and relates more particularly to an improved process for the stabilization of ripened and hydrolyzed organic acid esters of cellulose.

An object of this invention is the provision of an improved process for the treatment of ripened organic acid esters of cellulose, such as cellulose acetate, by heating said cellulose esters in an aqueous medium of low alkalinity under elevated temperature and pressure whereby the combined sulfates and alkalinity present therein are substantially reduced and the stability and molding qualities of said cellulose esters considerably improved.

Other objects of this invention will appear from the following detailed description.

In the process for preparing organic acid esters of cellulose such as, for example, cellulose acetate, in connection with which our invention will be more particularly described, the esterification reaction is usually carried out by treating cellulose with an esterification medium comprising acetic acid anhydride, an esterification catalyst, such as sulfuric acid, and acetic acid which is a solvent for the cellulose acetate being formed. The fully esterified cellulose tri-ester produced is obtained in the form of a viscous, homogeneous solution and water is then added to this primary cellulose acetate solution in an amount sufficient to convert any acetic acid anhydride remaining to acetic acid. The primary cellulose acetate in solution, usually after the addition of a further quantity of water for ripening, is then permitted to hydrolyze or ripen after some or all of the sulfuric acid catalyst present has been neutralized, from the cellulose tri-acetate initially formed to a secondary cellulose acetate, i. e. one of a lower degree of acetylation having the desired solubility characteristics.

During ripening, not only are some acetyl groups hydrolyzed from the cellulose acetate but, in addition, combined sulfuric acid is removed. Water and/or other non-solvent for the cellulose acetate is then added in an amount sufficient to precipitate the ripened or secondary cellulose acetate from solution. The precipitated cellulose acetate is washed with water to remove as much acid and other non-cellulose acetate materials as possible and is then subjected to a stabilization treatment with the object of still further reducing its content of combined sulfuric acid and to remove certain bodies which are conducive to color formation when the cellulose acetate is subjected to elevated temperature, as during molding.

The presence of combined sulfuric acid is objectionable since it tends to render the cellulose acetate liable to decomposition and degradation when the cellulose ester is exposed to elevated temperatures as during molding operations. The undesirable decomposition or degradation, which is determined by a measurement of the viscosity loss, may be avoided to some degree if the alkalinity of the cellulose acetate is sufficiently high, a condition which may be attained by washing the cellulose acetate with water of high alkalinity. However, a high alkaline content yields cellulose acetate of unsatisfactory color when the latter is molded. As well known in the art, stabilization may be effected by heating the ripened, precipitated cellulose acetate with from 10 to 30 parts by weight of distilled or demineralized water containing less than 5 parts per million alkalinity for each part by weight (dry weight) of cellulose acetate at superatmospheric pressures of 10 to 85 pounds per sq. inch for from ½ to 6 hours, or more. This stabilization effects a substantial reduction in the combined sulfuric acid and alkalinity of the cellulose acetate as well as a decrease in the color forming bodies present.

The pressure stabilization is particularly effective where the cellulose acetate has an acetyl value of 53 to 54%, calculated as acetic acid, which range includes the cellulose acetates which are normally employed in the production of yarns by the usual dry spinning operations. In the case of cellulose acetates having an acetyl value of 55 to 57%, which acetates are usually employed for molding operations at elevated temperatures and pressures, the stabilization treatment is not quite so satisfactory under the same given conditions since cellulose acetates of this degree of acetylation do not have as large a proportion of free hydroxy groups in the molecule and are, therefore, more hydrophobic in nature. To produce cellulose acetates in said range having a desired degree of stabilization high pressures and/or longer stabilization times are necessary to produce the same improvement in molding color than in the case of cellulose acetates containing a greater proportion of free hydroxyl groups. It is only under these more drastic conditions that the combined sulfuric acid, alkalinity and color-forming bodies are reduced to a sufficiently low level to enable these cellulose acetates to be satisfactorily employed in molding operations, without yielding molded materials which develop excessive color and which suffer substantial viscosity losses. However, an increase in the pressure employed and an extension in the time of the processing cycle is undesirable economically.

We have now found that ripened and precipitated organic acid esters of cellulose and particularly cellulose acetates having an acetyl value of 55 to 57% or more, calculated as acetic acid, may be stabilized more satisfactorily by stabilization processes involving the heating of said cellulose esters in an aqueous medium under elevated temperature and pressure. In accordance with our novel process, this advantageous result may be achieved if said cellulose esters are treated with a surface active agent prior to being subjected to stabilization or a surface active agent is added to the aqueous stabilization medium, prior to heating, in an amount of from 0.1 to 10% on the weight of the cellulose ester present and the aqueous medium is then heated to stabilization temperature. Most advantageously, the aqueous medium employed should contain less than 5 parts per million alkalinity. Not only are said cellulose esters more satisfactorily stabilized when treated with a surface active agent prior to stabilization or when such a surface active agent is present in the stabilizing medium, but the stabilization may be effected in a shorter period of time. Thus, when cellulose acetates, for example, stabilized in accordance with our novel process are subjected to molding operations, the latter develop considerably less color than cellulose acetates stabilized with water alone. Moreover, they do not suffer as great viscosity losses.

As examples of the surface active agents which may be employed in accordance with our novel process, there may be mentioned non-ionic surface active agents, such as the partial esters of polyhydric alcohols with long chain carboxylic acids, the partial and complete esters of certain water-soluble hydroxy-alkyl ethers of polyhydric alcohols with long chain carboxylic acids, ethers of polyhydric alcohols with long chain aliphatic alcohols, short chain hydroxyalkyl ethers of polyhydric alcohols esterified with long chain fatty alcohols, long chain alcohols with a number of free hydroxy groups, esters of long chain alcohols with polyhydroxy acids, long chain acetals of polyhydric alcohols, polyether alcohols, polyethylene glycols having a molecular weight of 200 to 600, condensation products of fatty acids with protein decomposition products and amides prepared from long chain amines and polyhydric acids. The non-ionic surface active agents are not ionized in solution and owe their effectiveness to a balance of polar and non-polar groups in the molecule. Their hydrophilic character is usually obtained by the presence of a certain minimum of accumulated polar groups such as free hydroxy or other oxygen groups. Anionic surface active agents may also be employed in accordance with the process of our invention. As suitable anionic agents there may be mentioned the salts of straight or branched long chain alkyl sulfates, such as, for example, sodium secondary tetradecyl sulfate. We preferably employ those non-ionic surface active agents which are the long chain fatty acid partial esters of polyoxyalkylene derivatives of hexitol anhydride. Optimum results are obtained employing the polyoxyethylene derivative of sorbitan mono-laurate which is obtained by esterifying the polyoxyethylene compound formed when sorbitan is condensed with ethylene oxide, employing lauric acid to effect said esterification.

When the cellulose esters are treated with a surface active agent prior to stabilization, the most satisfactory procedure comprises immersing the cellulose ester in an aqueous solution containing 0.1 to 10% on the weight of the cellulose acetate of the surface active agent and then agitating the cellulose ester in the solution for about 60 to 90 minutes at a temperature of 20 to 30° C. The solution of the surface active agent is then decanted and replaced with 10 to 30 parts by weight of distilled or demineralized water for each part by weight (dry weight) of the cellulose ester and the pressure stabilization conducted in the usual manner as described above. Excellent results are obtained by employing the surface active agent in this way. The solution of the surface active agent decanted from the cellulose ester may be employed again for treating additional quantities of the cellulose ester prior to pressure stabilization.

In order further to illustrate our invention, but without being limited thereto, the following examples are given:

*Example I*

100 parts by weight of washed cellulose acetate having an acetyl value of 55.7%, calculated as acetic acid, are suspended in 3000 parts by weight of distilled water and 6 parts by weight of the water soluble polyoxyethylene sorbitan monolaurate are added thereto. The mixture is heated in an autoclave to a temperature of 130° C. so that a pressure of 25 pounds per sq. inch gauge develops and is maintained under these conditions for 1½ hours. The fibrous cellulose acetate is removed, rinsed and again stabilized for 4½ hours without any further addition of the non-ionic surface active agent. The cellulose acetate is then washed and dried. When cellulose acetate stabilized in this way is molded into discs at a temperature of 200° C. for 15 minutes, the discs obtained have a yellowness coefficient of 0.15 and exhibit a viscosity loss of only 7%. Cellulose acetate stabilized under the same conditions but employing only distilled water yields molded discs having a yellowness coefficient of 0.20 and suffers a viscosity loss of 29%. The numerical expression of color development, i. e. the yellowness coefficient is obtained by measuring the light transmission of the disc at 640 micro-millimeters minus that at 440 micromillimeters divided by the light transmission of 640 micromillimeters. The greater this coefficient the greater the degree of color.

*Example II*

100 parts by weight of washed cellulose acetate having an acetyl value of 55.8% are added to 2500 parts by weight of distilled water contained in an autoclave and 0.1% of the non-ionic surface active agent employed in Example I, based on the weight of the cellulose acetate, is added thereto. The mixture is heated to a temperature of 130° C. so that a pressure of 25 pounds per sq. inch gauge develops and is maintained at this temperature for 5½ hours. When the stabilized cellulose acetate is washed and dried and then molded into discs at a temperature of 200° C. for 15 minutes, the discs obtained have a yellowness coefficient of 0.17. Discs molded of unstabilized cellulose acetate have a yellowness coefficient of 0.22. The yellowness coefficient of a disc molded of cellulose acetate stabilized under the above conditions but without employing a surface active agent is 0.19.

Example III 100 parts by weight of washed cellulose acetate having an acetyl value of 56%, calculated as acetic acid, are immersed in 2000 parts by weight of distilled water at 25° C. containing 10 parts by weight of the polyalkylene ether alcohol sold commercially under the trade name of "Triton NE" and the resulting slurry is then agitated for about 60 minutes. The solution is decanted and the cellulose acetate stabilized under pressure at 130° C. for six hours in 2500 parts by weight of distilled water. The stabilized cellulose acetate is then washed and dried. When the dried, stabilized cellulose acetate is molded into discs at a temperature of 200° C. for 15 minutes the discs obtained have a yellowness coefficient of 0.16.

While our invention has been more particularly described in connection with the production of stabilized cellulose acetate, it is to be understood, of course, that our novel stabilization process can also be employed in the production of other highly stable organic acid esters of cellulose. Examples of other organic acid esters of cellulose which may be stabilized in accordance with our novel process are cellulose propionate and cellulose butyrate, as well as mixed esters such as cellulose acetate-propionate and cellulose acetate-butyrate.

It is to be understood that the foregoing detailed description is given merely by way of illustration and that many variations may be made therein without departing from the spirit of our invention.

Having described our invention, what we desire to secure by Letters Patent is:

1. In a process for the stabilization of cellulose acetate having an acetyl value of 55 to 57%, calculated as acetic acid, the step which comprises treating said cellulose acetate with an aquous solution containing 0.1 to 10% by weight on the cellulose acetate of a non-ionic surface active agent at 20 to 30° C., decanting the aqueous solution and then heating said cellulose acetate at a temperature of 130 to 160° C. and a pressure of 10 to 85 pounds per square inch for ½ to 6 hours in 10 to 30 parts by weight, for each part by weight (dry weight) of cellulose acetate, of an aqueous medium of less than 5 parts per million alkalinity.

2. In a process for the stabilization of cellulose acetate, having an acetyl value of 55 to 57%, calculated as acetic acid the step which comprises treating said cellulose acetate with an aqueous solution containing 0.1 to 10% by weight on the cellulose acetate of a polyalkylene ether alcohol at 20 to 30° C., decanting the aqueous solution and then heating said cellulose acetate at a temperature of 130 to 160° C. and a pressure of 10 to 85 pounds per square inch for ½ to 6 hours in 10 to 30 parts by weight for each part by weight (dry weight) of cellulose acetate, of an aqueous medium of less than 5 parts per million alkalinity.

GEORGE W. SEYMOUR.
BLANCHE B. WHITE.
LEONARD J. ROSEN.

REFERENCES CITED

The following references are of record in the file of this patent:

UNITED STATES PATENTS

| Number | Name | Date |
| --- | --- | --- |
| 2,028,761 | Dreyfus | Jan. 28, 1936 |
| 2,028,763 | Dreyfus | Jan. 28, 1936 |
| 2,265,218 | Stone | Dec. 9, 1941 |

FOREIGN PATENTS

| Number | Country | Date |
| --- | --- | --- |
| 516,945 | Great Britain | Jan. 16, 1940 |
| 577,963 | Great Britain | June 6, 1946 |